United States Patent
Birmiwal et al.

(10) Patent No.: US 12,425,496 B2
(45) Date of Patent: Sep. 23, 2025

(54) INPUT STATE SYNCHRONIZATION FOR BORDER GATEWAY PROTOCOL (BGP) PROCESSES

(71) Applicant: Arista Networks, Inc., Santa Clara, CA (US)

(72) Inventors: Sharad Birmiwal, Burnaby (CA); Joanne Mikkelson, Milpitas, CA (US); Isidoros Kouvelas, Athens (GR); Jesper Skriver, Nicosia (CY); Asang Dani, Nagpur (IN)

(73) Assignee: Arista Networks, Inc., Santa Clara, CA (US)

( * ) Notice: Subject to any disclaimer, the term of this patent is extended or adjusted under 35 U.S.C. 154(b) by 523 days.

(21) Appl. No.: 18/155,302

(22) Filed: Jan. 17, 2023

(65) Prior Publication Data

US 2024/0244124 A1    Jul. 18, 2024

(51) Int. Cl.
*H04L 67/141* (2022.01)
*H04L 45/02* (2022.01)
*H04L 45/74* (2022.01)
*H04L 47/34* (2022.01)
*H04L 69/16* (2022.01)

(52) U.S. Cl.
CPC ............ *H04L 69/161* (2013.01); *H04L 45/04* (2013.01); *H04L 45/74* (2013.01); *H04L 47/34* (2013.01); *H04L 67/141* (2013.01)

(58) Field of Classification Search
None
See application file for complete search history.

(56) References Cited

U.S. PATENT DOCUMENTS

| | | |
|---|---|---|
| 7,230,914 B2 | 6/2007 | Sankar et al. |
| 7,286,468 B2 | 10/2007 | Scudder et al. |
| 7,417,947 B1 | 8/2008 | Marques et al. |
| 7,506,194 B2 | 3/2009 | Appanna et al. |
| 7,609,617 B2 | 10/2009 | Appanna et al. |
| 7,751,311 B2 | 7/2010 | Ramaiah et al. |
| 7,787,365 B1 | 8/2010 | Marques et al. |
| 7,801,135 B2 | 9/2010 | Appanna et al. |
| 7,940,650 B1 | 5/2011 | Sandhir et al. |
| 8,005,980 B2 | 8/2011 | Harvey et al. |
| 8,254,396 B2 | 8/2012 | Appanna et al. |
| 8,537,660 B2 | 9/2013 | Ramaiah et al. |
| 8,769,155 B2 | 7/2014 | Nagappan et al. |
| 9,106,525 B2 | 8/2015 | Ramaiah et al. |

(Continued)

FOREIGN PATENT DOCUMENTS

EP    2680515 B1    3/2017

*Primary Examiner* — Jenkey Van
(74) *Attorney, Agent, or Firm* — Treyz Law Group; Jason Tsai

(57) ABSTRACT

A networking system may facilitate Border Gateway Protocol (BGP) switchover between an active BGP process and a standby BGP process. A method is provided that includes using the active BGP process to establish a first communication session with a peer and a second communication session with the standby BGP process and using an active kernel associated with the active BGP process to receive a packet from the peer, to transmit the packet to the standby BGP process, and to receive the packet returning from the standby BGP process. The active kernel can optionally be used to determine whether any packets are in-flight to and from the standby BGP process.

20 Claims, 10 Drawing Sheets

(56) References Cited

U.S. PATENT DOCUMENTS

| | | | |
|---|---|---|---|
| 9,166,904 B2 | 10/2015 | Appanna | |
| 9,356,859 B2 | 5/2016 | Hanif et al. | |
| 9,491,107 B1* | 11/2016 | Scudder | H04L 45/28 |
| 2007/0086461 A1* | 4/2007 | Ward | H04L 45/04 |
| | | | 370/392 |
| 2010/0265956 A1 | 10/2010 | Li | |
| 2012/0140616 A1 | 6/2012 | Zhou et al. | |
| 2022/0263706 A1* | 8/2022 | Seth | H04L 45/60 |
| 2023/0095362 A1* | 3/2023 | Xu | G06F 11/2048 |
| | | | 370/216 |
| 2023/0116449 A1* | 4/2023 | Qu | H04L 69/163 |
| | | | 709/224 |

\* cited by examiner

INPUT STATE SYNCHRONIZATION FOR BORDER GATEWAY PROTOCOL (BGP) PROCESSES

BACKGROUND

A communication system can include multiple network devices that are interconnected to form a network for conveying packets from a source device to a destination device. Routing information indicating the route through which the packets are to be conveyed from the source device to the destination device can be shared amongst one or more peer network devices using Border Gateway Protocol (BGP) established over corresponding Transmission Control Protocol (TCP) sessions between pairs of peer network devices.

Each network device can run a BGP process to maintain an inbound routing table or an outbound routing table and to convey routing information such as network layer reachability information (NLRI) to facilitate the use of BGP amongst its peer network devices.

DETAILED DESCRIPTION

Figure 1:
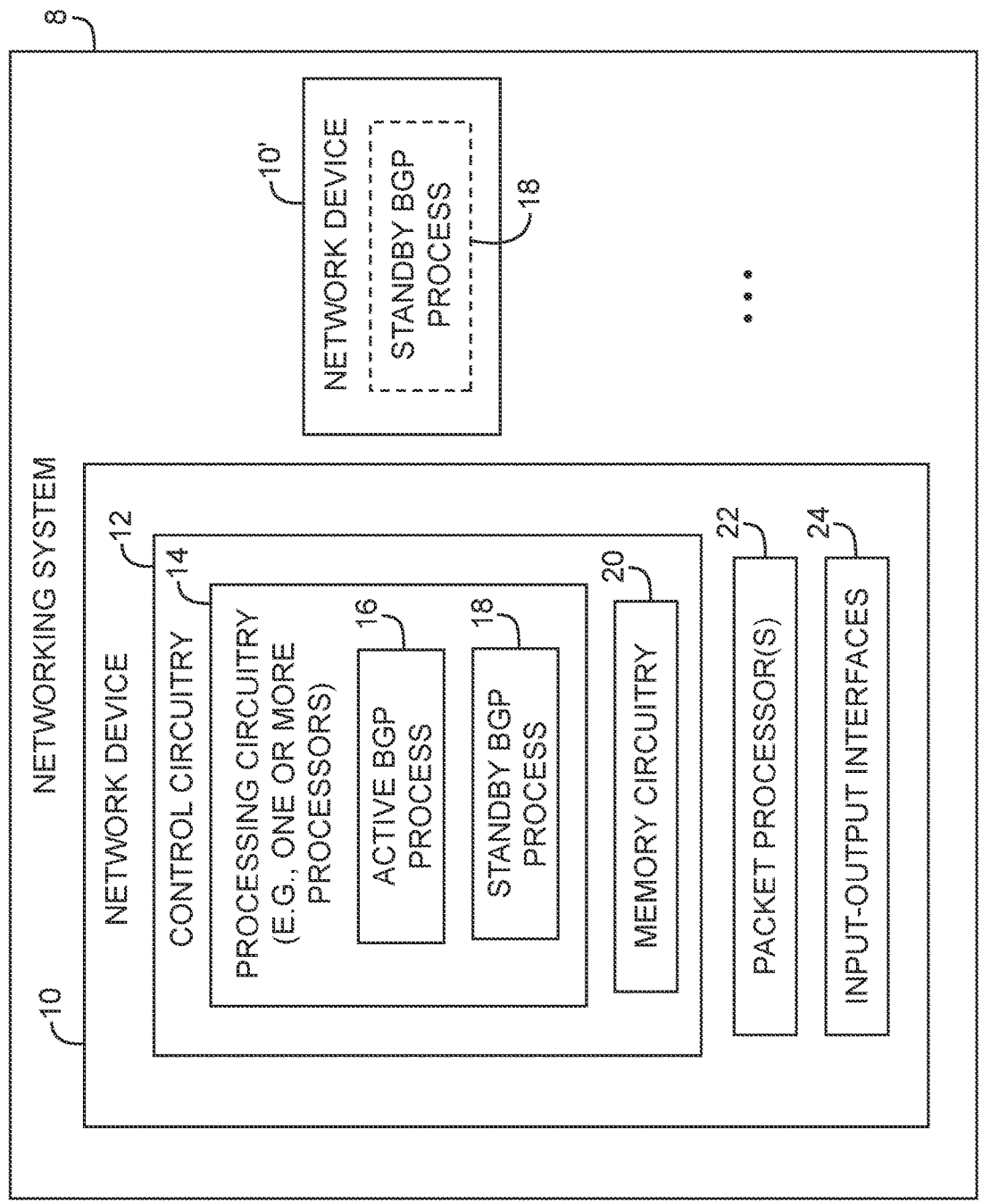
FIG. 1 is a diagram of an illustrative networking system configured to run an active Border Gateway Protocol (BGP) process and a standby BGP process in accordance with some embodiments.

Network devices such as routers (e.g., multi-layer L2/L3 switches) may use Border Gateway Protocol (BGP) to exchange routing information. As an example, a network device may exchange routing information using BGP with one or more peer network devices over corresponding Transport Control Protocol (TCP) sessions. Each of these network devices may execute or run a BGP process that facilitates the reception of routing information such as network layer reachability information (NRLI) in BGP update messages from one or more peer network devices, the processing of the received routing information to determine a best routing path, and/or the transmission of routing information in BGP update messages to one or more peer network devices. Neighboring BGP devices are sometimes referred to as peers or BGP peers.

In practice, a network device, or more specifically, the BGP process running on the network device can experience downtime or failure events that disrupt the exchange of routing information and the network device's role as a peer to other devices in the network. It may therefore be desirable to provide BGP switchover or failover functionalities such that the network device can resolve or bypass any such failure events and to do so in a manner such that its peers are unaware that the network device and/or BGP process executed thereon are experiencing downtime or failure to help avoid any disruption.

Providing BGP failover/switchover functionalities or generally preparing the network device to resolve any failure events may consume processing resources at the network device (e.g., processing resources more desirably reserved for normal BGP processing such as path selection or other control plane functions of the network device). As such, it may further be desirable to minimize resource expenditure at network device and/or the BGP process when preparing to resolve any failure events when providing the BGP failover functionalities.

Accordingly, a networking system may execute (run) a standby BGP process with which an active BGP process on the network device can perform a switchover operation in response to the downtime or failure event affecting the active BGP process. The standby BGP process may become the active (primary) BGP process after a switchover operation. The standby BGP process may be executed concurrently with the active BGP process using similar or identical state information received by the active BGP process. In other words, state information may be synchronized between the active and standby BGP processes. In some embodiments, conveying edge state information instead of internal state information from the active BGP process to the standby BGP process can help preserve significant processing resources. In contrast to internal state information, "edge" state information may generally refer to routing information that traverse an edge of a BGP process (e.g., inbound routing information received at a BGP process and outbound routing information output from a BGP process).

An illustrative networking system configured to provide BGP process switchover functionalities in a manner that minimizes disruption of a BGP process for a network device and efficiently utilizes processing resources at the network device in preparation for the BGP process switchover is shown in FIG. 1. As shown in FIG. 1, networking system 8 may include one or more network devices. Each network device in system 8 may be a switch (e.g., a multi-layer L2/L3 switch), a router or gateway, a bridge, a hub, a repeater, a firewall, a wireless access point, a device serving other networking functions, a device that includes a combination of these functions, or other types of network devices. Multiple such network devices having the same or different networking functions in system 8 may be present and interconnected to form a communications network that forwards traffic (e.g., data packets) between end hosts.

The communications network may be implemented with any suitable scope (e.g., as a wide area network, including one or more campus area networks or including one or more local area networks, etc.). If desired, the communications network may include internet service provider networks (e.g., the Internet) or other public service provider networks, private service provider networks (e.g., multiprotocol label switching (MPLS) networks), and/or may include other types of networks such as telecommunication service provider networks (e.g., a long-term evolution (LTE) network).

An illustrative network device of networking system 8 is network device 10. Configurations in which network device 10 is a router, a switch having L3 (layer 3 or network layer) processing functionalities (e.g., a multi-layer switch), or any other electronic device with network routing functionalities are sometimes described herein as an example.

As shown in FIG. 1, network device 10 may include control circuitry 12, one or more packet processor(s) 22, and input-output interfaces 24 disposed within a housing of network device 10. Control circuitry 12 may include processing circuitry 14 and memory circuitry 20. The housing of network device 10 may include an exterior cover (e.g., a plastic exterior shell, a metal exterior shell, or an exterior shell formed from other rigid or semirigid materials) that provides structural support and protection for the components of network device 10 mounted within the housing.

Processing circuitry 14 may include one or more processors or processing units based on central processing units (CPUs), graphics processing units (GPUs), microprocessors, general-purpose processors, host processors, microcontrollers, digital signal processors, programmable logic devices such as a field programmable gate array device (FPGA), application specific system processors (ASSPs), application specific integrated circuit (ASIC) processors, and/or other types of processors. Processing circuitry 14 may run (execute) a network device operating system and/or other software/firmware that is stored on memory circuitry 20.

Memory circuitry 20 may include non-transitory (tangible) computer readable storage media that stores the operating system software and/or any other software code, sometimes referred to as program instructions, software, data, instructions, or code. As an example, the operations described herein for facilitating the BGP switchover as well as other network device control plane functions may be stored as (software) instructions on the non-transitory computer-readable storage media (e.g., in portion(s) of memory circuitry 20 in network device 10). The corresponding processing circuitry (e.g., one or more processors of processing circuitry 14 in network device 10) may process or execute the respective instructions to perform the corresponding operations (e.g., for facilitating the BGP switchover). Memory circuitry 20 may be implemented using non-volatile memory (e.g., flash memory or other electrically-programmable read-only memory configured to form a solid-state drive), volatile memory (e.g., static or dynamic random-access memory), hard disk drive storage, and/or other storage circuitry. Processing circuitry 14 and memory circuitry 20 as described above may sometimes be referred to collectively as control circuitry 12 (e.g., implementing a control plane of network device 10).

In particular, processing circuitry 14 may execute network device control plane software such as operating system software, routing policy management software, routing protocol agents or processes (e.g., one or more BGP processes such as an active BGP process 16 and optionally a standby BGP process 18), routing information base (RIB) agents, and other control software, may be used to support the operation of protocol clients and/or servers, may be used to support the operation of packet processor(s) 22, may store packet forwarding information, may execute packet processing software, and/or may execute other software instructions that control the functions of network device 10 and the other components therein. While processing circuitry 14 is primarily described herein as executing one or more BGP processes, processing circuitry 14 may also execute one or more other network routing protocol agents or processes. As examples, these other network protocol agents may implement non-BGP distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), Immediate system-to-immediate system (IS-IS) protocol, or other Internet routing protocols (just to name a few).

Packet processor(s) 22 may be used to implement a data plane or forwarding plane of network device 10. Packet processor(s) 22 may include one or more processors or processing units based on central processing units (CPUs), graphics processing units (GPUs), microprocessors, general-purpose processors, host processors, microcontrollers, digital signal processors, programmable logic devices such as a field programmable gate array device (FPGA), application specific system processors (ASSPs), application specific integrated circuit (ASIC) processors, and/or other processor architectures.

Packet processor 22 may receive incoming data packets via input-output interfaces 24 (e.g., ports), parse and analyze the received data packets, process the packets based on packet forwarding decision data (e.g., in a forwarding information base) and/or in accordance with a network protocol, and forward (or drop) the data packet accordingly. The packet forwarding decision data may be stored on a portion of memory circuitry 20 and/or other memory circuitry integrated as part of or separate from packet processor 16.

Input-output interfaces 24 may include communication interface components such as one or more Bluetooth interface, Wi-Fi interface, Ethernet interface, optical interface, and/or other network interfaces for connecting network device 10 to the Internet, a local area network, a wide area network, a mobile network, other types of networks, and/or to another network device, peripheral devices, and/or other electronic equipment. Network device 10 may also include other components such as a system bus or connector(s) that couple the components of network device 10 to one another, power management components, thermal management components, etc.

In the example of FIG. 1, processing circuitry 14 may execute (run) a BGP process such as active BGP process 16 to exchange network routing information and network device capabilities with other network devices (sometimes referred to herein as peer network devices or "peers" of network device 10). Active BGP process 16 can sometimes be referred to as the primary BGP process. In particular, network device 10 may establish a TCP session with each peer and may exchange BGP messages over each of these TCP sessions with a corresponding network device. Use of TCP sessions to link together multiple peers in a BGP network is merely illustrative. If desired, other types of network communication links, sessions, or paths can be employed. The exchanged network routing information may be used to generate or otherwise inform the packet forwarding decision data and therefore the packet forwarding behavior of packet processor 22, among other functions.

Network device 10 and the components therein such as control circuitry 12 can experience unplanned downtime or failure events, which can disrupt the execution of active BGP process 16. Accordingly, a separate BGP process such as a standby BGP process 18 may also run on processing circuitry 14 in device 10 or elsewhere in networking system 8 such as at network device 10' (e.g., on processing circuitry of network device 10' executing on software instructions for a standby BGP process stored on the memory circuitry of network device 10'). In an illustrative configuration described herein as an example, network device 10' may have at least the same components and functionalities as described for network device 10 (e.g., device 10' be another instance of network device 10). If desired, network device 10' may omit some of the components and functionalities of network device 10 and/or may include additional components or functionalities than those described for network device 10.

In general, active BGP process 16 and standby BGP process 18 may be executed on the same processor or on any combination of different processors. As examples, active and standby BGP processes 16 and 18 can be executed on the same processor in processing circuitry 14, can be executed on two different processors in processing circuitry 14 in the same network device 10, or can be executed on respective processors of two different network devices 10 and 10' (e.g., in configurations where network devices 10 and 10' are housed in the same housing and/or mounted to the same chassis to implement active and standby supervisors on the same modular system having multiple line cards). If desired, the active BGP process may be executed on a processor on local equipment (e.g., on network device 10), whereas the standby BGP process may be executed on computing resources on remote server equipment.

Figure 2:
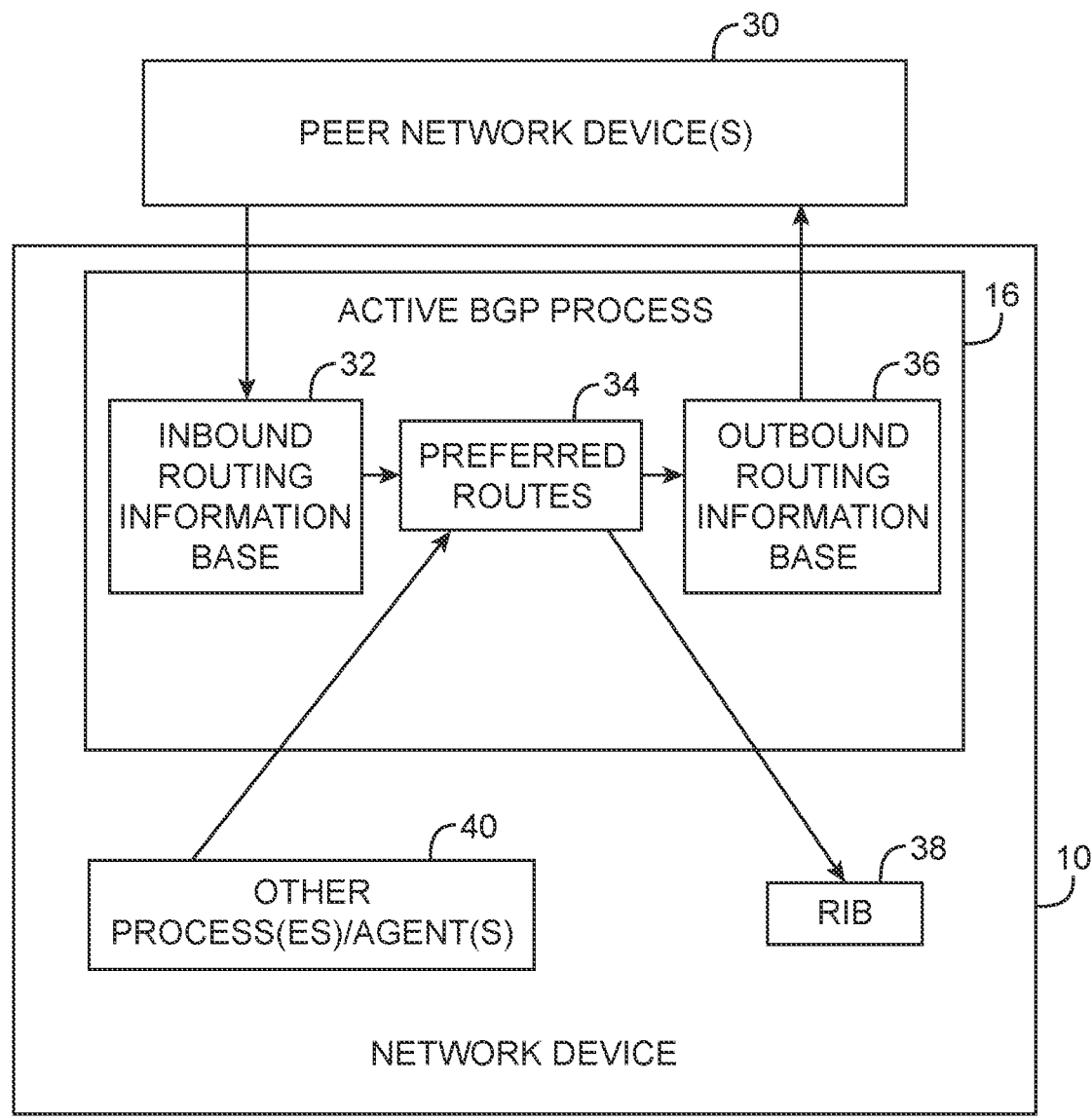
FIG. 2 is a diagram of an illustrative network device configured to communicate with one or more BGP peer network devices in accordance with some embodiments.

FIG. 2 is a diagram of an illustrative BGP process such as active BGP process 16 running on network device 10. Active BGP process 16 may exchange network routing information (e.g., network layer reachability information (NLRI) and attributes) with one or more peer network devices 30 on which respective BGP processes can run. Network device 10 running active BGP process 16 and peer network device(s) 30 may communicate via BGP connections established over corresponding TCP sessions.

In particular, active BGP process 16 may receive routing information such as NLRIs and attributes from each peer network device 30 over a corresponding TCP session with that peer network device 30. The received routing information may be stored at inbound routing information base (RIB) 32 (sometimes referred to as incoming routing information base 32 or incoming RIB received from a neighboring or adjacent peer, and is thus sometimes referred to as "Adj-RIB-In"). Active BGP process 16 may maintain the incoming routing information (e.g., a collection of routes) at inbound RIB 32 by storing not yet processed routing information received from peer network devices 30. Active BGP process 16 may among other functions, perform a route selection operation (sometimes referred to as a best path algorithm) by processing the received routing information stored at inbound RIB 32, along with other inputs from other processes/agents 40, to determine a set of preferred routes 34. Active BGP process 16 may maintain a local RIB (e.g., local to active BGP process 16) to store the set of determined preferred routes.

As part of performing route selection, active BGP process 16 may use at least two routes (sometimes referred to as paths) including one or more received advertised routes stored at inbound RIB 32 and/or one or more preferred routes stored at the local RIB to the same destination. Active BGP process 16 may compare the different paths sharing the same destination to arrive at a preferred path to that destination. This comparison may be based on a comparison of different attributes or parameters associated with the paths being compared. As examples, the compared attributes or parameters, in order of comparison, may be the local weight of each path (e.g., with higher weights preferred), the local preference for each path, whether a path originated locally via an aggregate or a network, the shortest AS_PATH (autonomous system path), origin type of each path (e.g., Exterior Gateway Protocol (EGP) preferred over Interior Gateway Protocol (IGP)), multi exit discriminator (MED) for each path (e.g., with lower MED preferred), whether each path is external BGP or internal BGP (e.g., external BGP preferred over internal BGP), IGP metric of each path (e.g., with lower IGP metric to the BGP next hop preferred), order of paths received (e.g., first received path preferred), router ID of BGP peer network device from which each path is received (e.g., with lower router ID preferred), cluster list of each path (e.g., with lower length of cluster list preferred), and neighbor address of each path (e.g., with lower neighbor address preferred). The new preferred path may then be stored at the local RIB as the preferred route for the destination.

One or more stored preferred routes at the local RIB may be installed or stored at the routing information base (RIB) 38 for network device 10. RIB 38 (sometimes referred to as main RIB 38 or network device RIB 38) may include routes based on which packet forwarding decision data is generated (e.g., for use by packet processor(s) 22 in FIG. 1). Depending on the configuration of network device 10, the BGP preferred route may not always be installed on RIB 38 (e.g., routes from other protocol agents and/or static routes may instead be installed on RIB 38 for any particular destination).

One or more stored preferred routes at the local RIB may further be conveyed to and installed or stored on outbound RIB 36 (sometimes referred to as outgoing RIB 36 or outgoing RIB that is sent to a neighboring or adjacent peer, and is thus sometimes referred to as "Adj-RIB-Out") for advertising to peer devices routing information (e.g., NLRIs and attributes). Active BGP process 16 may maintain the outgoing routing information (e.g., a collection of routes) at outbound RIB 36 by storing not yet advertised routing information. Active BGP process 16 may convey the routing information for advertisement to each peer network device 30 over a corresponding TCP session with that peer network device 30. The set of peer network devices 30 from which advertised routing information is received may be the same or may be different from the set of peer network devices 30 to which advertised routing information is transmitted.

While inbound RIB 32, the local RIB storing preferred routes 34, outbound RIB 36, and main RIB 38 are sometimes shown or referred to herein as separate data structures for storing routing information, the different RIBs may (if desired) be implemented on a shared data storage structure and/or across any combination of data storage components (e.g., on memory circuitry 20 in FIG. 1). Configurations in which inbound RIB 32, the local RIB storing preferred routes 34, and outbound RIB 36 are stored on a shared data storage circuit on memory circuitry 20, while main RIB 38 is stored on a separate data storage circuit on memory circuitry 20 are sometimes described herein as an illustrative example.

Figure 3:
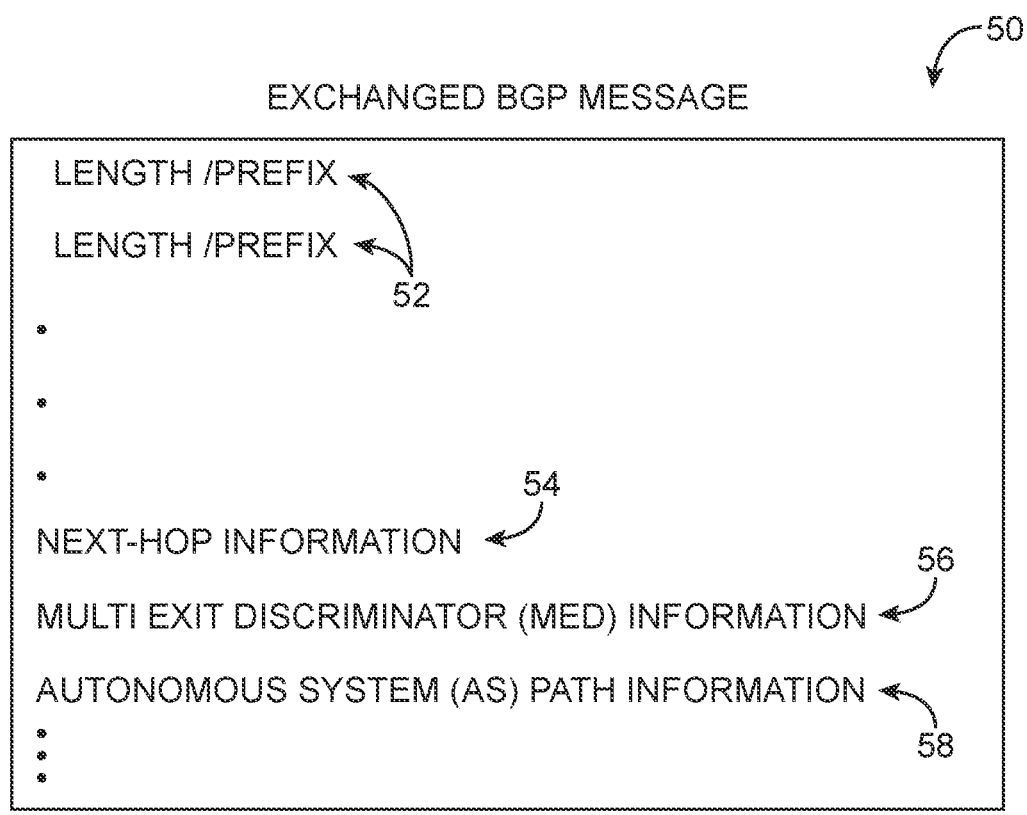
FIG. 3 is a diagram of an illustrative BGP update message in accordance with some embodiments.

FIG. 3 is a diagram of an illustrative BGP message such as a BGP update message that can be received by network device 10 from a peer network device 30 and/or sent to a peer network device 30 by network device 10. In particular, BGP (update) message 50 may include NLRI 52 that includes one or more paths (routes) defined by corresponding sets of a length and a network prefix (e.g., 2-tuples) that are reachable by the transmitting peer network device. In particular, the length may represent a network mask (e.g., in Classless Inter-Domain Routing notation such as /8, /16, /23, /24, /25, etc.) and the prefix may represent the network address for the subnet. Each pair of a length and a network prefix defines a path or route and may sometimes be referred to herein as a path or route.

Additionally, BGP message 50 may include attributes for the paths such as next-hop information 54 (e.g., information indicative of the IP address of the border router that should be used as the next hop to the destination of the routes listed in NLRI 52), multi exit discriminator (MED) information 56 (e.g., information used to discriminate between multiple exit points to a neighboring autonomous system), autonomous system (AS) path information 58 such as a sequence of AS path segments, and/or any other desired set of paths attributes for advertisement amongst peer BGP network devices (e.g., origin information indicative of the origin of the path information, local preference information indicative of the degree of preference for an advertised route, etc.). While not explicitly illustrated in the example of FIG. 3, BGP update message 50 may also include information indicative of withdrawn routes (e.g., destinations that have become unreachable and are being withdrawn from service).

As an example, active BGP process 16 (FIG. 2) in receipt of BGP message 50 may first store the received NLRI and path attributes advertised by a peer network device 30 in inbound RIB 32. During processing, active BGP process 16 may use one or more of the path attributes (e.g., attribute information 54, 56, and 56 and/or other path attributes) from the received NLRI 52 to select a preferred route. A route (or multiple routes, if specified) in NLRI 52 may be installed as a preferred route for a specific destination on the local RIB of active BGP process 16. The route may optionally be installed in main RIB 38 of network device 10 (FIG. 2) and/or may optionally be installed in outbound RIB 36 for advertising to other peer network devices 30.

In accordance with some embodiments, it may be beneficial to operate the standby BGP process such that it can handle a switchover on short notice and without behaving disruptively in a way that is noticeable to peer BGP devices. A seamless switchover from an active BGP process to a standby BGP process may require synchronization of states between the active and standby BGP processes. In particular, the embodiments described herein relate to synchronizing input state information such as routing information in the inbound RIBs.

Figure 4:
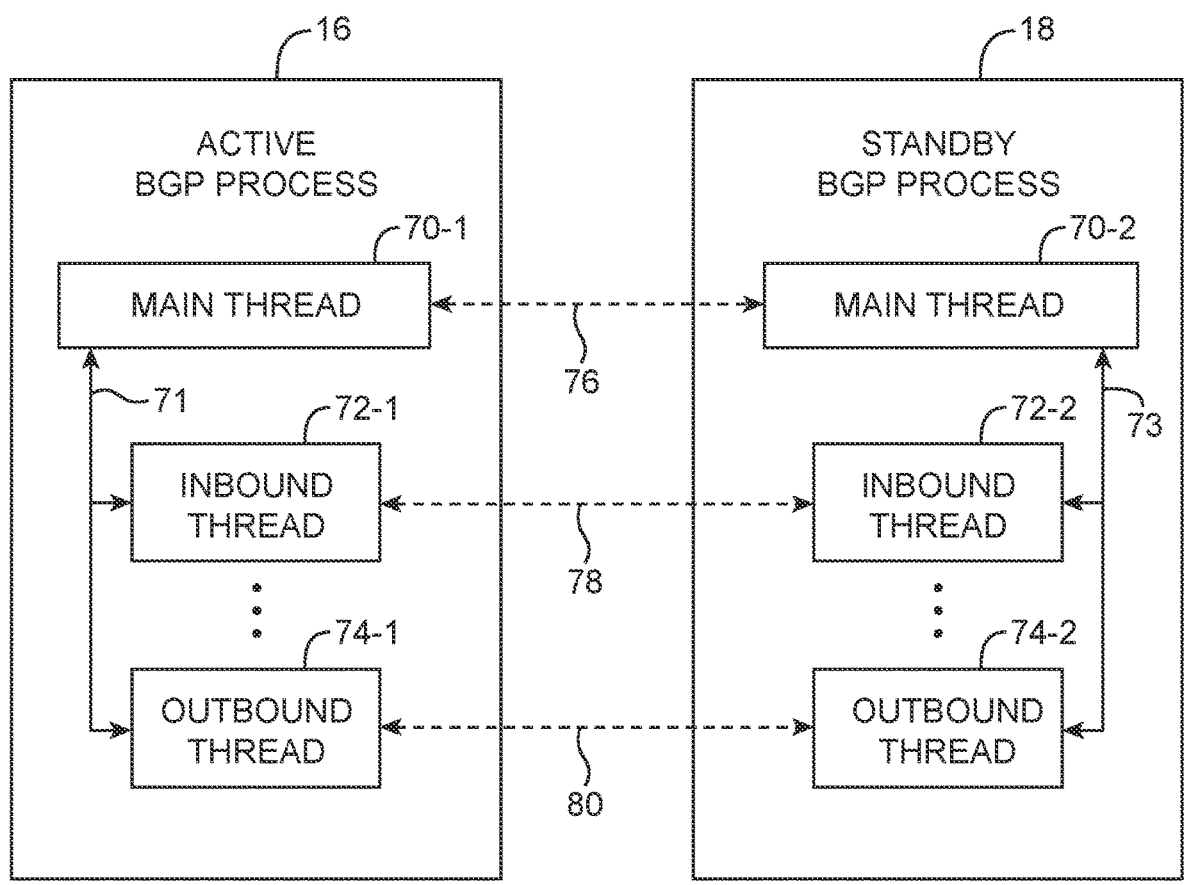
FIG. 4 is a diagram showing multiple synchronization channels between an active BGP process and a standby BGP process in accordance with some embodiments.

FIG. 4 is a diagram showing multiple synchronization channels between an active BGP process 16 and a standby BGP process 18. Active BGP process 16 can be executed on one or more processors and is sometimes referred to as an active (primary) agent (see, e.g., FIG. 6). Standby BGP process 18 can be executed on one or more processors (e.g., on the same processor or on a different processor than the active BGP process) and is sometimes referred to as a standby (secondary) agent. As shown in FIG. 4, multiple threads can run on each process. Active BGP process 16 can include a first main thread 70-1, a first inbound thread 72-1, a first outbound thread 74-1, and optionally other RIB threads. Standby BGP process 18 can include a second main thread 70-2, a second inbound thread 72-2, a second outbound thread 74-2, and optionally other RIB threads.

The main thread 70 in each BGP process may be configured as a synchronization manager that coordinates state synchronization operations between active BGP process 16 and standby BGP process 18. For instance, main thread 70-1 can oversee synchronization staging and control synchronization logic in inbound thread 72-1 and outbound thread 74-1 using cross-thread channels 71 within active BGP process 16. Similarly, main thread 70-2 can oversee synchronization staging and control synchronization logic in inbound thread 72-2 and outbound thread 74-2 using cross-thread channels 73 within standby BGP process 18.

To coordinate synchronization operations between active BGP process 16 and standby BGP process 18, main thread 70-1 (sometime referred to as the active main thread) can communicate with main thread 70-2 (sometimes referred to as the standby main thread) via a first TCP channel 76. To synchronize input or inbound state information, inbound thread 72-1 (sometimes referred to as the active inbound thread) can communicate with inbound thread 72-2 (sometimes referred to as the standby inbound thread) via a second TCP channel 78. To synchronize output or outbound state information, outbound thread 74-1 (sometimes referred to as the active outbound thread) can communicate with outbound thread 74-2 (sometimes referred to as the standby outbound thread) via a third TCP channel 80. The use of TCP based channels in synchronization state information between active BGP process 16 and standby BGP process 18 is merely illustrative. If desired, inter-agent channels based on other types of network communications protocols such as User Datagram Protocol (UDP), Transport Layer Security (TLS) protocol, Secure Sockets Layer (SSL) protocol, or other protocols can be employed.

Figure 5:
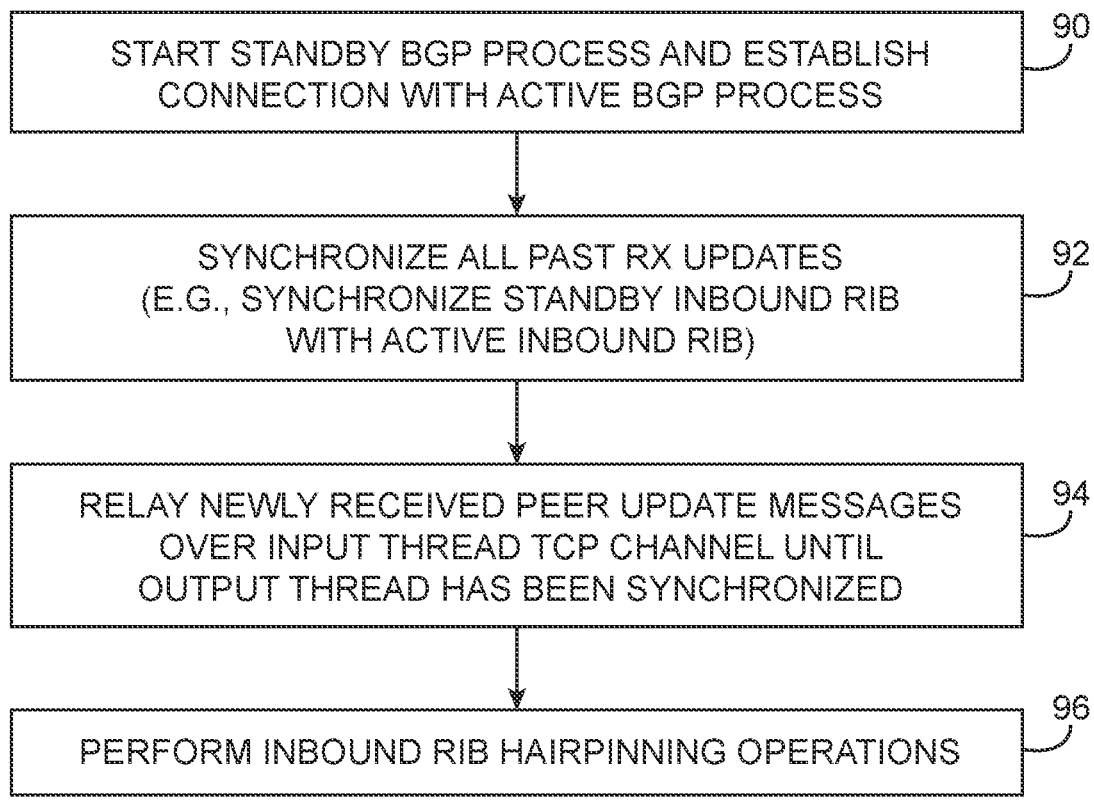
FIG. 5 is a flow chart of illustrative steps for performing input state synchronization in accordance with some embodiments.

FIG. 5 is a flow chart of illustrative steps for performing input state synchronization. During the operations of block 90, a standby BGP process such as standby BGP process 18 can start running or be instantiated. Once standby BGP process 18 is started, standby BGP process 18 can establish a connection with a corresponding active BGP process 16 via one or more TCP channels and output a request asking to be synchronized with active BGP process 16. In general, active BGP process 16 can initiate synchronization of routing identifiers, attribute information, next hop reachability or resolution, and established peers, which can be established at any point in time to trigger their synchronization.

During the operations of block 92, all past receive (RX) updates can be synchronized at standby BGP process 18. For instance, an inbound RIB within standby BGP process 18 can be synchronized with an inbound RIB within active BGP process 16. An inbound RIB can refer to and be defined herein as a collection of routes received from neighboring/ adjacent peers and is therefore sometimes referred to as "Adj-RIB-In"). The inbound RIB within active BGP process 16 can be referred to as an active inbound RIB, whereas the inbound RIB within standby BGP process 18 can be referred to as a standby inbound RIB. To synchronize the standby inbound RIB with the active inbound RIB, paths or routes previously received by active BGP process 16 can be forwarded to and recorded within the standby inbound RIB. The operations of block 92 are sometimes referred to as initial input state synchronization operations. The collection (table) of routes may be advertised to standby BGP process 18 in the form of BGP update messages (see, e.g., FIG. 3). This is merely illustrative. In other embodiments, the input state information being sent from the active BGP process to the standby BGP process during this initial synchronization need not be packaged in the form of BGP update messages but can be encoded in other forms of data transport.

Figure 6:
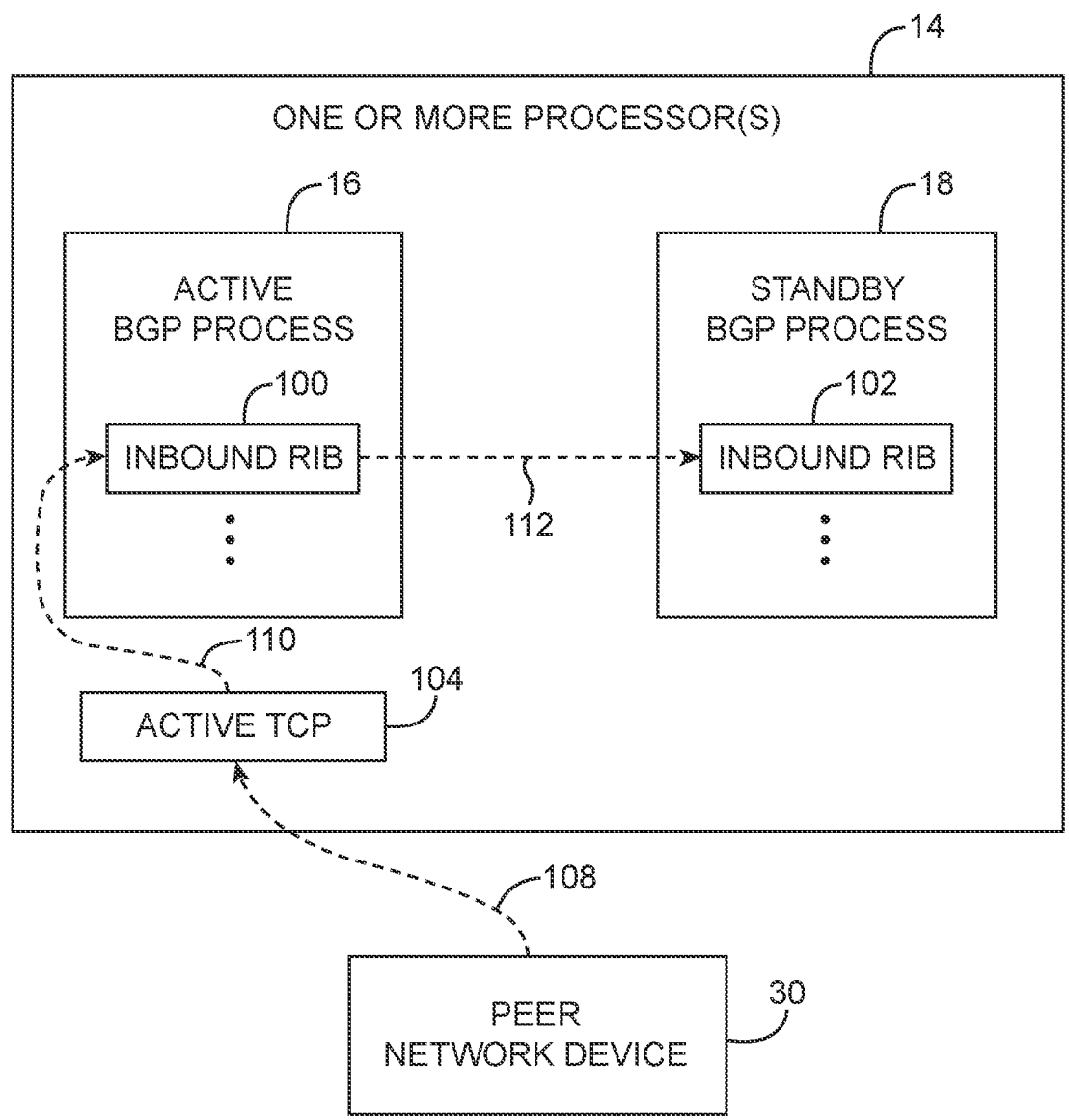
FIG. 6 is a diagram showing how newly received peer update messages can be relayed from an active BGP process to a standby BGP process in accordance with some embodiments.

During the operations of block 94, all newly received peer update messages (e.g., BGP messages received at active BGP process 16 from one or more peers) may be relayed over the input thread TCP channel until the output thread has been synchronized. This data flow is illustrated in FIG. 6. As shown in FIG. 6, peer network device 30 can send a new BGP update message to active BGP process 16 (see path 108) via an active TCP stack 104. Active TCP stack 104 can then forward the newly received peer update message to active inbound RIB 100 to be recorded.

To ensure that standby BGP process 18 is kept in sync with active BGP process 16, the newly received peer update message is also forwarded to inbound RIB 102 of standby BGP process 18 via an inter-process (inter-agent) channel such as TCP channel 112. Channel 112 may be similar to channel 78 linking the active and standby inbound threads as shown and described in connection with FIG. 4. This relaying of new BGP update messages from the active agent to the standby agent may continue until the output (outbound) thread has also been synchronized. Synchronization output state information can involve conveying or retransmitting all paths or routes previously advertised (transmitted) by active BGP process 16 to its peers to the outbound RIB in standby BGP process 18. In other words, synchronizing output state information may involve synchronizing the outbound RIB in standby BGP process 18 with the outbound RIB in active BGP process 16.

During the operations of block 96, active BGP process 16 may be configured to perform inbound RIB hairpinning operations with standby BGP process 18. Inbound RIB hairpinning operations can be performed to ensure ongoing synchronization between the active and standby BGP processes after the initial synchronization operations and after the outbound RIBs have been synchronized. Such inbound RIB hairpinning operations, which can involve using the standby BGP stack to intercept all peer updates before they reach the active TCP stack, are shown and described in more detail in connection with FIGS. 7 and 8.

Figure 7:
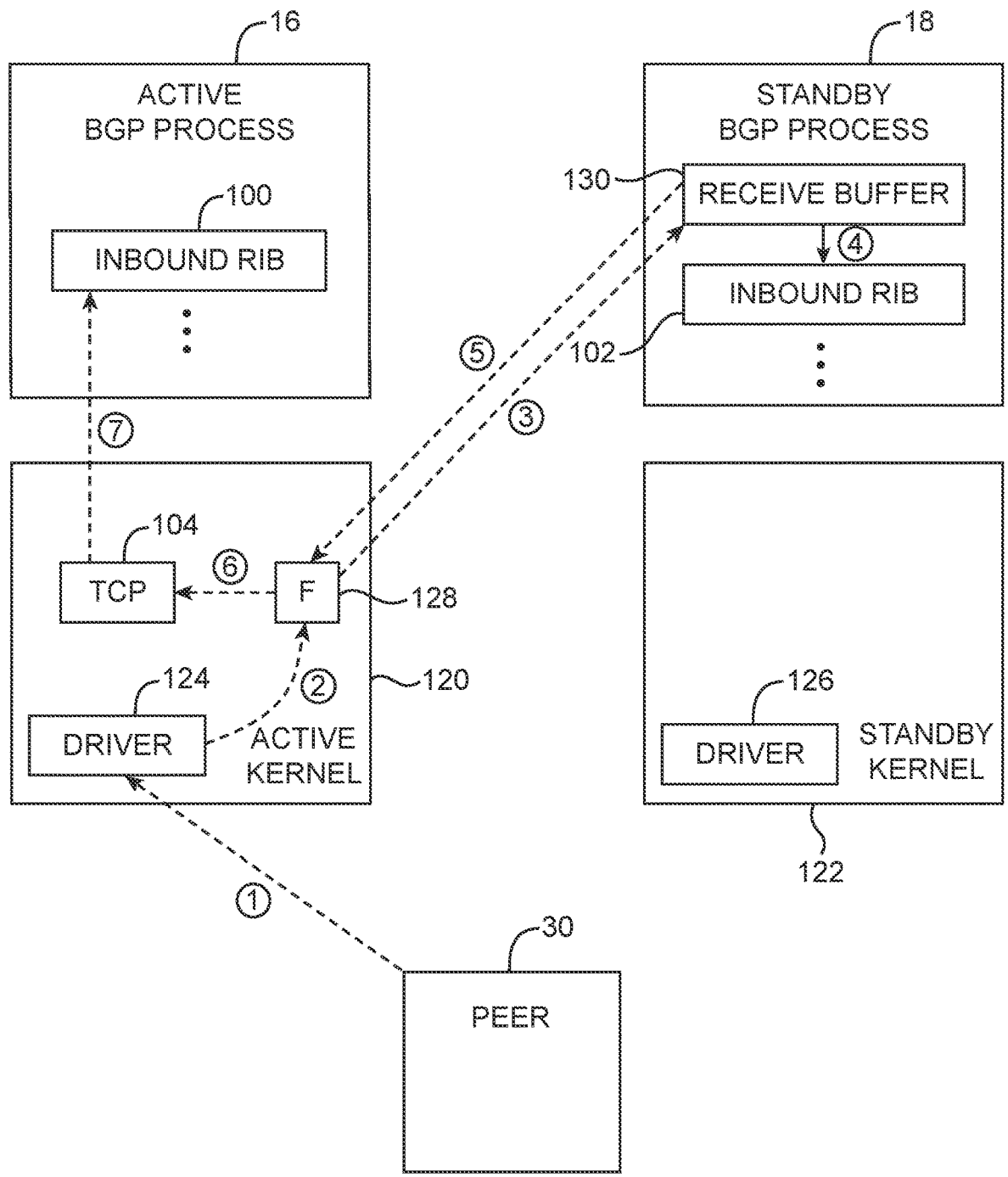
FIG. 7 is a diagram illustrating inbound peer update message hairpinning between active and standby BGP processes in accordance with some embodiments.
Figure 8:
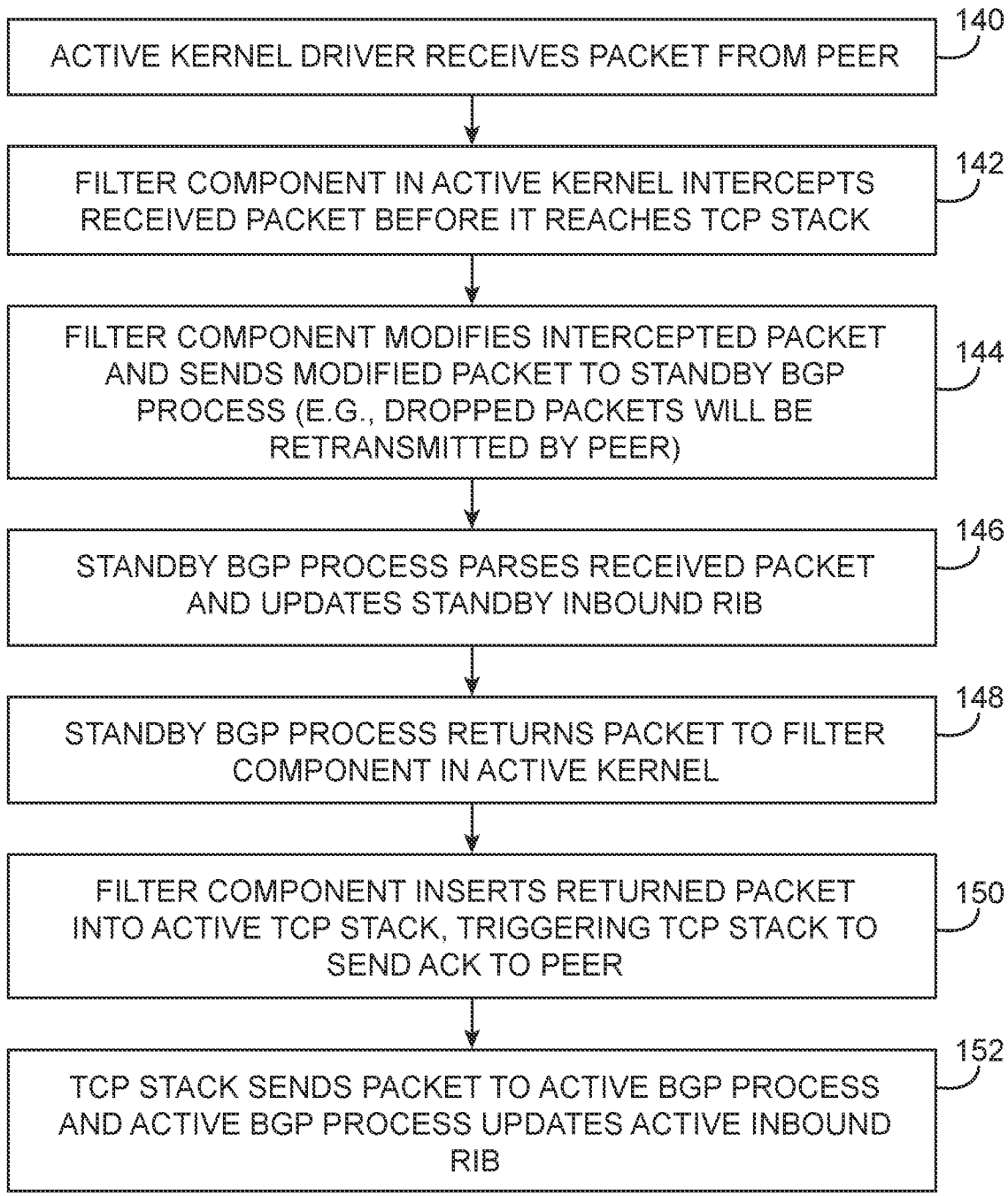
FIG. 8 is a flow chart of illustrative steps for performing the hairpinning operations of FIG. 7 in accordance with some embodiments.

FIG. 7 is a diagram illustrating inbound peer update message hairpinning between active BGP process 16 and standby BGP process 18. The operation of the components shown in FIG. 7 is best understood in conjunction with the flow chart of FIG. 8. During the operations of block 140, an active kernel driver such as active kernel driver 124 shown in FIG. 7 may receive a BGP message (sometimes referred to as a TCP message) from peer network device 30, as shown by the dotted arrow labeled "1". The BGP message received from peer 30 can be an update message, a route refresh message, a keepalive message, a notification message, or other BGP/TCP message or packet, all of which can be hairpinned as described below. Active kernel driver 124 may represent a software or hardware driver component running on an active kernel 120 associated with active BGP process 16. Active BGP process 16 and active kernel 120 can run on one or more processors within a network device 10 of the type shown in FIG. 1. Standby BGP process 18 may also be provided with an associated standby kernel such as kernel 122. Standby kernel 122 may also include a standby kernel driver 126. Standby kernel driver 126 may represent a software or hardware driver component running on standby kernel 122. Active kernel 120 and standby kernel 122 may for example, be Linux based kernels, Unix based kernels, Windows based kernels, Android based kernels, XNU based kernels, or kernels based other operating systems During the operations of block 142, a filter component such as filter component 128 in active kernel 120 may intercept the received update message(s) before the update message(s) reaches the active TCP stack 104. This data interception, redirection, or temporary diversion from the active TCP stack 104 is shown by the dotted arrow labeled "2" in FIG. 7. Filter component 128 may represent a packet manipulation and filtering feature running on selected network devices that support BGP switchover.

During the operations of block 144, filter component 128 may optionally modify the intercepted message(s) and forward the update message(s) to standby BGP process 18, as shown by the dotted arrow labeled "3" in FIG. 7. Filter component 128 can thus be used to divert traffic intended for the active TCP stack 104 to the standby BGP process 18. For example, filter component 128 may modify an intercepted update message by adding header information and/or metadata indicating where that packet came from or where that packet is going. Operated in this way, packet loss can be protected or prevented by the TCP mechanism. If a particular intercepted message or packet is somehow lost and never sent back to active TCP stack 104, the active TCP stack 104 will not send an acknowledgement back to the corresponding peer 30. If peer device 30 does not receive such receipt acknowledgement from active TCP stack 104, peer device 30 will eventually resend the same (presumably lost) update message to active kernel 120. Thus, all dropped messages or packets will be retransmitted by peer network device 30.

During the operations of block 146, standby BGP process 18 can parse the received message and use the parsed information to update the inbound RIB in standby BGP process 18 (assuming the received message is a BGP update message), as shown by the arrow labeled "4" in FIG. 7. In particular, the intercepted message(s) can be received and queued at a receive buffer 130 within the standby BGP process 18. The information queued at receive buffer 130 can subsequently be used to update the information stored in the standby inbound RIB 102.

During the operations of block 148, standby BGP process 18 can return the intercepted message(s) or packet(s) back to filter component 128 in active kernel 120 (as shown by the dotted arrow labeled "5" in FIG. 7). The data flow represented by arrows 3 and 5 can be conveyed over a TCP channel (as an example) or other types of channel(s) that support input state (inbound thread) synchronization.

During the operations of block 150, filter component 128 may insert the returned message(s) or packet(s) into active TCP stack 104, as shown by the dotted arrow labeled "6" in FIG. 7. Filter component 128 may use the header/metadata information in the returned message(s) to determine where to inject the returned message(s) within the active TCP stack 104 (sometimes also referred to as the active TCP pipeline associated with primary BGP agent 16). Filter component 128 may insert the returning packet back into the TCP stack where the packet would have been received originally but for the interception. Filter component 128 may optionally remove the head/metadata information from the returned packet before inserting the packet into the active TCP pipeline. Active BGP process 16 may in response to receiving a message or packet from filter component 128, send a corresponding acknowledgment to peer 30 to let peer 30 know that the message has been properly received and not lost in transit.

During the operations of block 152, the active TCP stack 104 may send the message(s) or packet(s) received from filter component 128 during the operations of block 150 to the active BGP process 16 (as shown by the dotted arrow labeled "7" in FIG. 7). The active BGP process 16 may use this received information to update its own active inbound RIB 100. Operated in this way, any new inbound update message received from peer 30 can be synchronized between the active and standby BGP processes (e.g., so that the active inbound RIB 100 and the standby inbound RIB 102 reflect the same collection of routes as reported from the adjacent peers).

Such data flow as illustrated by the dotted paths in FIG. 7 in which the inbound routing update information is intercepted by filter component 128, diverted to standby BGP process 18, looped back to filter component 128, inserted into active TCP stack 104, and then finally delivered to active BGP process 16 is sometimes referred to and defined herein as inbound update message (packet) "hairpinning" operations, inbound update hairpinning operations, or inbound RIB hairpinning operations. Operated in this way, inbound routing information can be properly synchronized between the active and standby BGP processes when a peer sends update messages intended for an active BGP process 16 while the standby BGP process is live or ready. Performing hairpinning operations in this way may be technically advantageous since it does not require significant changes to the active BGP process nor any changes to the peers originating the updates (i.e., the hairpinning operations are hidden and occur seamlessly from the peers' perspective). Moreover, since the traffic diversion or redirection is performed using filter component 128 outside of the active TCP stack 104, different versions of BGP stacks can potentially run as the active and standby processes.

As described above, inbound (ingress) BGP updates can be hairpinned with the standby BGP process 18 before arriving at the active TCP stack. Such traffic hairpinning provides BGP traffic snooping capability on the standby BGP process. In practice, they may be one or more queues along the hairpin path where the update packets may be buffered. A functional BGP peer can send a packet that is temporarily buffered at one of these queues (e.g., queues along paths "3" and "5" labeled in FIG. 7) outside the local kernel buffers. If, however, a hold timer expires while an in-transit packet is queued in one of these buffers, the active BGP process may find that its local TCP kernel buffer is empty and incorrectly infer that the BGP peer is not sending packets and reset the BGP session with that peer.

In general, an active BGP process employs two timers to keep track of each peer it is connected to such as a keepalive timer and a hold timer. Peers can be BGP "speakers" that send a keepalive message periodically before the expiry of the keepalive timer. Transmission of a keepalive message may indicate that the BGP speaker is functioning properly. Transmission of a BGP update message or other packets can also be considered as a proxy for sending keepalive packets, which indicate that the BGP speaker is operating correctly. On the other hand, the hold timer is used to detect when BGP peers are inoperative, dysfunctional, or misbehaving. A peer that does not send a keepalive message or other message before the hold timer expires is treated as misbehaving, which triggers a BGP session reset. Resetting a BGP session is costly as it can cause network churn and take many CPU cycles on the network devices being reset to resume normal operation.

Figure 9:
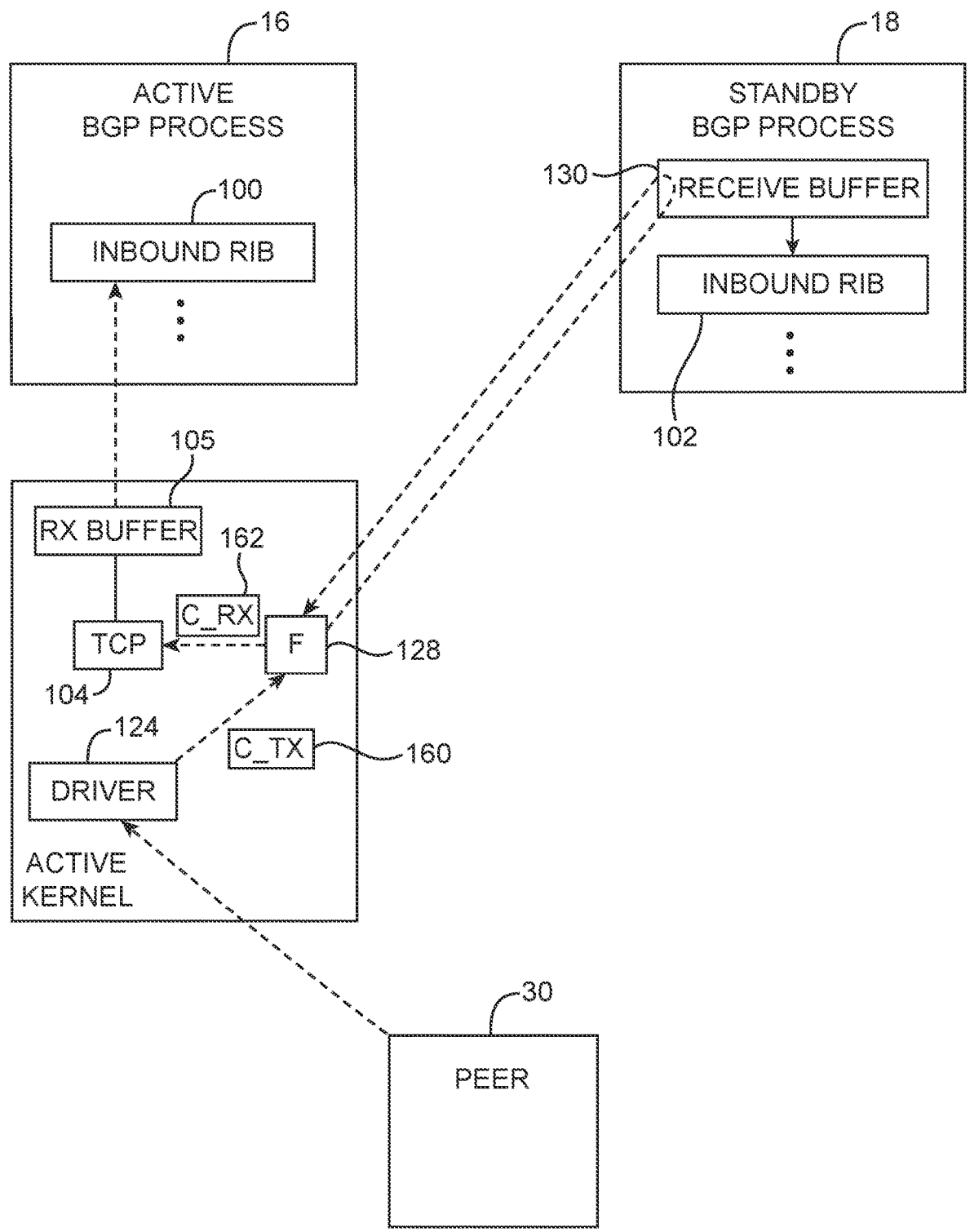
FIG. 9 is a diagram illustrating the use of peer hairpin transmit and receive sequence numbers in preventing BGP session resets in accordance with some embodiments.

In accordance with some embodiments, each hairpinned packet (or message) can be associated with one or more tracking sequence numbers to determine whether any hairpinned packets are still in flight between the active and standby BGP processes. FIG. 9 is a diagram illustrating the use of peer hairpin transmit and receive sequence numbers in preventing BGP session resets. As shown in FIG. 9, a first counter such as counter 160 can be used to output a first sequence number C_TX that keeps track of the last (most recently intercepted) packet being transmitted to standby BGP process 18. For instance, counter 160 may monotonically increment the first sequence number C_TX whenever filter component 128 intercepts a newly received packet from driver 124. The first sequence number C_TX is therefore sometimes referred to as a peer hairpin transmit (TX) sequence number. An incoming packet can optionally be stamped with C_TX and included as part of the additional head information included with the modified packet being intercepted by filter component 128.

Additionally, a second counter such as counter 162 can be used to output a second sequence number C_RX that keeps track of the last (most recently) packet received from standby BGP process 18. For instance, counter 162 keeps track of a second sequence number C_RX whenever filter component 128 sends a packet to active TCP stack 104. The second sequence number C_RX may be a copy of the sequence number seen in the hairpinned packet received from the standby BGP process at filter component 128. Active TCP stack 104 can then send the packet to a local TCP kernel buffer 105. Local TCP kernel buffer 105 is sometimes referred to as an active kernel receive buffer or a receive kernel buffer. Packets queued in active kernel receive buffer 105 can subsequently be sent to inbound RIB 100 of active BGP process 16. The second sequence number C_RX is therefore sometimes referred to as a peer hairpin receive (RX) sequence number. Sequence numbers C_TX and C_RX can be maintained on a per peer basis (e.g., the status of each BGP peer can be tracked using separate TX counters 162 and using separate RX counters 162). The remaining components shown in FIG. 9 are already described in connection with FIG. 7 and need not be reiterated in detail to avoid obscuring the present embodiment.

Figure 10:
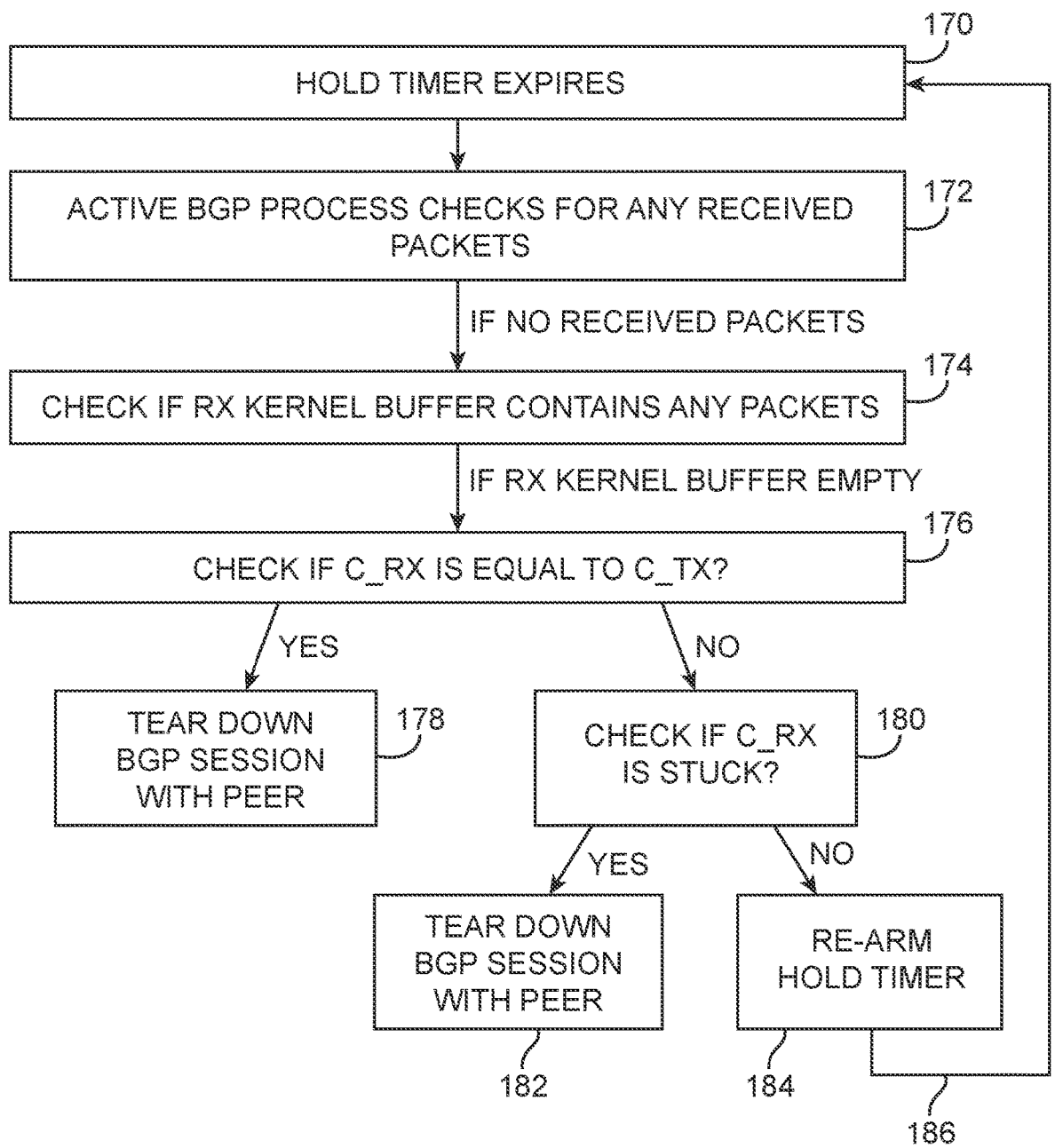
FIG. 10 is a flow chart of illustrative steps for operating an active BGP process of the type shown in FIG. 9 in accordance with some embodiments.

The operation of the various components of FIG. 9 is best understood in conjunction with the flow chart of FIG. 10. During the operations of block 170, a hold timer associated with active BGP process 16 may expire. The hold timer duration may be at least 1 second, at least 2 seconds, at least 3 seconds, 3-10 seconds, 10-100 seconds, more than 100 seconds, 100-200 seconds, less than 100 seconds, more than 50 seconds, 50-100 seconds, 200-400 seconds, more than 200 seconds, or other suitable hold time duration.

During the operations of block 172, active BGP process 16 may check for any newly received packets (or messages) from its peer(s). If there are no newly received packets, active BGP process 16 may then check if the receive kernel buffer 105 contains any packets (see block 174). If the kernel buffer 105 is empty, then active BGP process may then check if hairpin receive sequence number C_RX is equal to hairpin transmit sequence number C_TX (see operations of block 176). The C_TX being compared can be taken directly from counter 160 or parsed from the header information, which can include the stamped C_TX count value, in the returning packet. A comparison logic can be used to determine where C_TX and C_RX are matching.

A sequence number C_TX that matches sequence number C_RX means that most recent packet transmitted to standby BGP process 18 is equal to the most recent packet received from standby BGP process 18, which indicates that there are no queued packets in flight between the active and standby BGP process. Thus, in response to determining that C_TX is equal to C_RX, the BGP session can be teared down or reset due to the expiry of the hold timer.

A sequence number C_TX that is mismatched from sequence number C_RX means that most recent packet transmitted to standby BGP process 18 is not the same as the most recent packet received from standby BGP process 18, which indicates that there can be queued packets in flight between the active and standby BGP process. Active BGP process 16 may optionally perform an additional check at block 180 to determine whether sequence number C_RX is stuck at some value for an extended period of time. For example, process 16 may check to see whether C_RX has been stuck at some fixed count value for more than 300 seconds, for more than 400 seconds, for more than 500 seconds, for 200-1000 seconds, for more than 1000 seconds, or for other predetermined duration. If C_RX has been stuck at a fixed value for one or more hold timer periods (as an example), then most likely something has gone awry and the BGP session should be teared down or reset (see block 182). If, however, C_RX is not stuck and has recently incremented, then there is a chance that C_RX will catch up to C_TX, and the hold timer can be re-armed (see block 184). Processing can then loop back to wait for the next expiration of the hold timer, as shown by path 186.

Operated in this way, detecting the presence of in-flight packets in the hairpin path between the active kernel and the standby BGP processes can serve as a proxy for data coming from a BGP peer to help prevent unnecessary BGP session resets even when the hold timer expires. Since the stamping and recording of sequence numbers C_RX and C_TX are handled with the active kernel 120, minimal change is required at standby BGP process 18 (i.e., the standby BGP process 18 can ignore any stamped sequence numbers entirely, which simplifies the standby BGP stack).

The methods and operations described above in connection with FIGS. 1-10 may be performed by the components of one or more network device(s) using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., using processing circuitry 14 of FIG. 1).

The foregoing is merely illustrative and various modifications can be made to the described embodiments. The foregoing embodiments may be implemented individually or in any combination.

What is claimed is:

1. A method of operating a network device, comprising:
   with an active Border Gateway Protocol (BGP) process running on the network device, establishing a first communication session with a peer device;
   with the active BGP process, establishing a second communication session with a standby Border Gateway Protocol (BGP) process;
   with an active kernel associated with the active BGP process, receiving a packet from the peer device via the first communication session;
   with the active kernel, transmitting the packet to the standby BGP process via the second communication session;
   using information in the packet transmitted from the active kernel to the standby BGP process via the second communication session to update an inbound routing information base (RIB) on the standby BGP process; and
   with the active kernel, receiving the packet from the standby BGP process via the second communication session.

2. The method of claim 1, further comprising:
   with the active kernel, delivering the packet to the active BGP process subsequent to receiving the packet from the standby BGP process via the second communication session; and
   using information in the delivered packet to update an inbound routing information base (RIB) on the active BGP process.

3. The method of claim 1, further comprising:
   with a driver component on the active kernel, receiving the packet from the peer device and sending the packet to a packet filtering component on the active kernel.

4. The method of claim 3, further comprising:
   with the packet filtering component, modifying the packet by adding header information to the packet.

5. The method of claim 3, further comprising:
   with the packet filtering component, sending the packet to a receive buffer within the standby BGP process.

6. The method of claim 5, further comprising:
   with the packet filtering component, receiving the packet returning from the standby BGP process.

7. The method of claim 6, further comprising:
   with the packet filtering component, inserting the returned packet into a Transmit Control Protocol (TCP) stack on the active kernel.

8. The method of claim 7, further comprising:
   sending the returned packet from the TCP stack to the active BGP process.

9. The method of claim 7, further comprising:
   in response to receiving the returned packet at the TCP stack, sending a corresponding acknowledge to the peer device.

10. The method of claim 1, further comprising:
    synchronizing a standby inbound routing information base (RIB) on the standby BGP process with an active inbound routing information base (RIB) on the active BGP process by sending inbound state information previously received at the active BGP process to the standby BGP process.

11. The method of claim 10, further comprising:
    relaying one or more incoming packets from the active inbound RIB to the standby inbound RIB.

12. The method of claim 1, further comprising:
    subsequent to a hold timer expiring, determining whether the packet is in-flight between the active kernel and the standby BGP process.

13. The method of claim 12, wherein determining whether the packet is in-flight between the active kernel and the standby BGP process comprises comparing a receive sequence number with a transmit sequence number maintained at the active kernel.

14. A method of operating a network device, comprising:
    with an active Border Gateway Protocol (BGP) process running on the network device, establishing a first communication session with a peer device;
    with the active BGP process, establishing a second communication session with a standby Border Gateway Protocol (BGP) process;
    with an active kernel associated with the active BGP process, receiving a packet from the peer device via the first communication session; and subsequent to a hold timer expiring, determining whether one or more packets are in-flight between the active kernel and the standby BGP process.

15. The method of claim 14, further comprising:

in response to determining that no packets are in-flight between the active kernel and the standby BGP process, tearing down or resetting the first communication session with the peer device.

16. The method of claim 14, further comprising:

subsequent to determining that one or more packets are in-flight between the active kernel and the standby BGP process, re-arming the hold timer without resetting the first communication session.

17. The method of claim 14, further comprising:

incrementing a first sequence number when a packet is received at the active kernel from the peer device; and updating a second sequence number when a packet is received at a Transmit Control Protocol (TCP) kernel buffer of the active kernel, wherein determining whether one or more packets are in-flight between the active kernel and the standby BGP process comprises comparing the first sequence number to the second sequence number.

18. The method of claim 17, further comprising:

checking whether the second sequence number has been stuck at a fixed value for a predetermined period of time.

19. A system comprising:

an active Border Gateway Protocol (BGP) process having a first inbound routing information base (RIB);

a standby Border Gateway Protocol (BGP) process having a second inbound routing information base (RIB); and an active kernel associated with the active BGP process and configured to receive information from a peer device, convey the information to the standby BGP process so that the standby BGP process can use the conveyed information to update the second inbound RIB, receive the information returning back from the standby BGP process, and deliver the returning information to the active BGP process so that the active BGP process can use the delivered information to update the first inbound RIB.

20. The system of claim 19, wherein the active kernel is further configured to determine whether any data is in-flight to and from the standby BGP process.

* * * * *